(12) United States Patent
Xu et al.

(10) Patent No.: US 11,475,301 B2
(45) Date of Patent: Oct. 18, 2022

(54) METHOD, SYSTEM, AND COMPUTER PROGRAM PRODUCT FOR DETERMINING RELATIONSHIPS OF ENTITIES ASSOCIATED WITH INTERACTIONS

(71) Applicant: Visa International Service Association, San Francisco, CA (US)

(72) Inventors: Renjun Xu, San Francisco, CA (US); Emily Xu, San Francisco, CA (US); James McDonald Bostock, San Mateo, CA (US); Lisa Hammitt, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 317 days.

(21) Appl. No.: 16/730,187

(22) Filed: Dec. 30, 2019

(65) Prior Publication Data

US 2020/0210833 A1  Jul. 2, 2020

Related U.S. Application Data

(60) Provisional application No. 62/786,008, filed on Dec. 28, 2018.

(51) Int. Cl.
*G06F 16/28* (2019.01)
*G06N 3/08* (2006.01)
*G06Q 30/06* (2012.01)
*G06F 16/9535* (2019.01)
*G06Q 20/08* (2012.01)
*G06F 16/901* (2019.01)

(52) U.S. Cl.
CPC ............ *G06N 3/08* (2013.01); *G06F 16/288* (2019.01); *G06F 16/9024* (2019.01); *G06F 16/9535* (2019.01); *G06Q 20/085* (2013.01); *G06Q 30/0609* (2013.01)

(58) Field of Classification Search
CPC . G06F 16/288; G06F 16/9024; G06F 16/9535
See application file for complete search history.

(56) References Cited

U.S. PATENT DOCUMENTS

2017/0316099 A1\* 11/2017 Xu ........................ G06Q 50/01
2019/0121866 A1\* 4/2019 Garg ....................... H04L 51/32
2019/0205481 A1\* 7/2019 Gutnik ................ G06F 16/9024

\* cited by examiner

*Primary Examiner* — Grace Park
(74) *Attorney, Agent, or Firm* — The Webb Law Firm

(57) ABSTRACT

A method for determining relationships of entities associated with interactions may include receiving interaction data associated with interactions between first and second entities. The interaction data may include first entity identification data, second entity identification data, and relative timing data. A node may be generated for each second entity. A set of edges may be generated for each first entity to include an edge connecting the node associated with second entity identification data of each interaction to the node associated with second entity identification data of a next interaction based on the relative timing data. Sample data associated with a portion of the nodes/edges may be generated. A vector for each node of the sample may be generated. A distance between each vector and other vectors may be determined. A relationship between each second entity may be determined based on the distance. Systems and products are also disclosed.

16 Claims, 15 Drawing Sheets

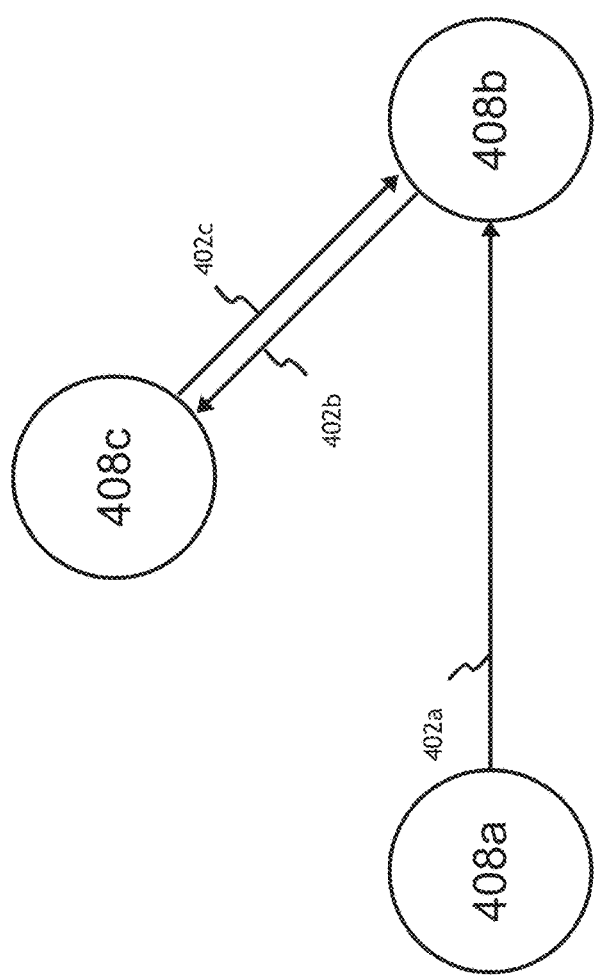

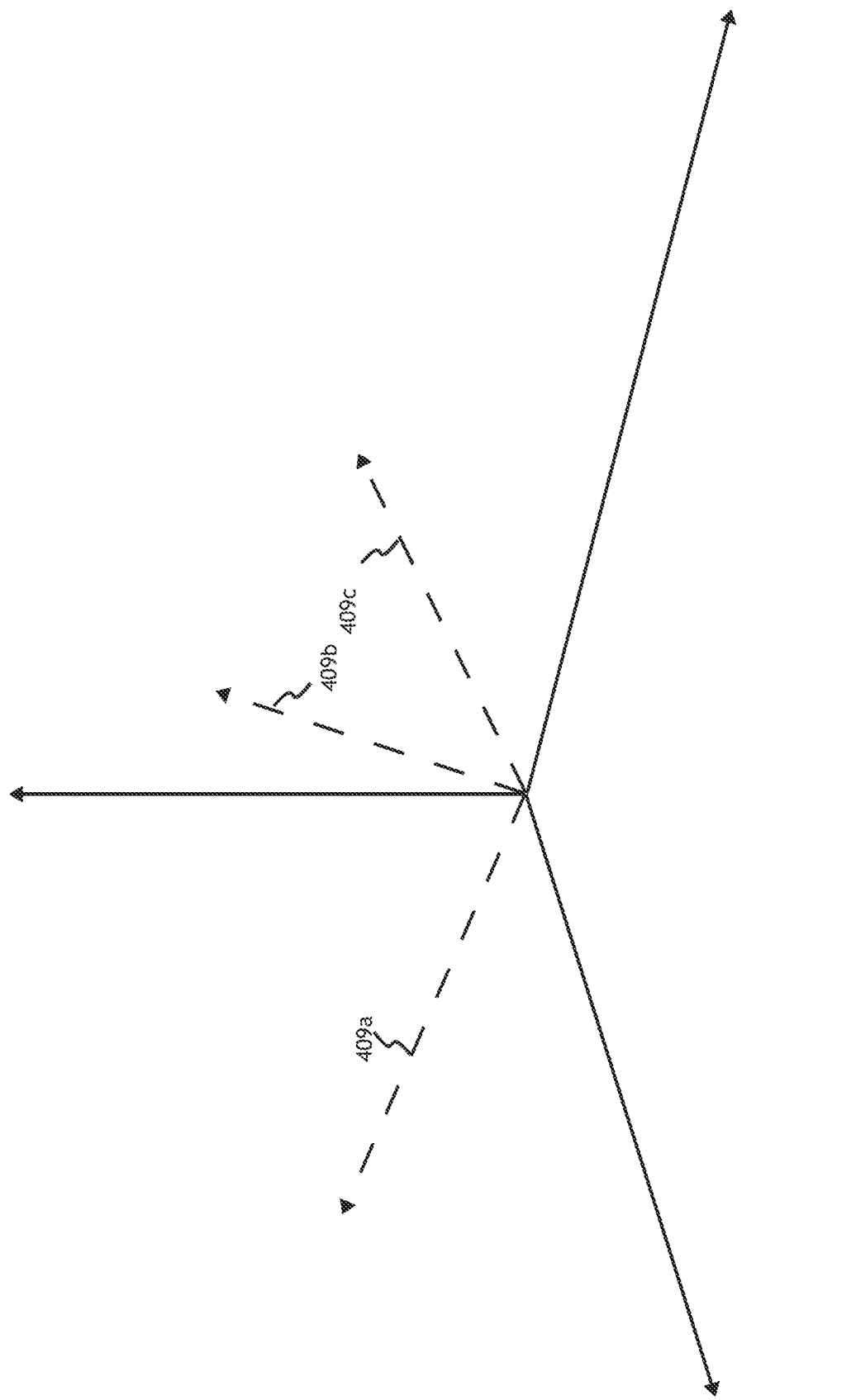

METHOD, SYSTEM, AND COMPUTER PROGRAM PRODUCT FOR DETERMINING RELATIONSHIPS OF ENTITIES ASSOCIATED WITH INTERACTIONS

CROSS REFERENCE TO RELATED APPLICATIONS

The present application claims the benefit of U.S. Provisional Patent Application No. 62/786,008, filed Dec. 28, 2018, the disclosure of which is hereby incorporated by reference in its entirety.

BACKGROUND

1. Field

This disclosed subject matter relates generally to methods, systems, and products for determining relationships of entities associated with interactions and, in some particular embodiments, to a method, system, and computer program product for determining relationships of entities associated with interactions based on graphs.

2. Technical Considerations

In certain networks of entities, it may be difficult to determine relationships between entities. For example, certain entities may be peers, competitors, complementary to each other, partnered, and/or the like. However, as networks grow larger (e.g., more entities included), determining and/or identifying that such relationships exist and/or quantifying the level of such relationships may require detailed, time consuming study of an increasing amount of information. Additionally, certain portions (e.g., fields) of information may be missing, incomplete, inaccurate, contain misspellings and/or the like.

Additionally or alternatively, in certain networks of entities, the amount of interaction data associated with interactions between the entities may grow very large, e.g., as the number of entities increases and/or the number of interactions between entities increases. For example, for interactions such as transactions (e.g., payment transactions) between entities (e.g., customers and merchants), the amount of interaction data (e.g., payment transaction data) may include millions of interactions each day.

Predictive models (e.g., machine learning models, artificial intelligent models, neural networks, and/or the like) may attempt to be trained using the interaction data. However, the time needed to train such predictive models may increase as the amount of data increases. For example, training such predictive models based on transaction data (e.g., payment transaction data and/or the like) that includes millions (e.g., hundreds of millions) of transactions may take days, weeks, over a month, or more.

SUMMARY

Accordingly, it is an object of the presently disclosed subject matter to provide methods, systems, and computer program products for determining relationships of entities associated with interactions.

According to non-limiting embodiments, provided is a method for determining relationships of entities associated with interactions. In some non-limiting embodiments, a method for determining relationships of entities associated with interactions may include receiving interaction data associated with a plurality of interactions between a plurality of first entities and a plurality of second entities. The interaction data associated with each interaction of the plurality of interactions may include first entity identification data identifying a respective first entity of the plurality of first entities, second entity identification data identifying a respective second entity of the plurality of second entities, relative timing data associated with a relative timing of the interaction, any combination thereof, and/or the like. A node may be generated for each second entity of the plurality of second entities. A set of edges may be generated for each respective first entity of the plurality of first entities. The set of edges may include, for each interaction of the plurality of interactions including first entity identification data identifying the respective first entity, an edge connecting the node associated with second entity identification data of the interaction to the node associated with second entity identification data of a next interaction of the plurality of interactions including first entity identification data identifying the respective first entity based on the relative timing data of the interaction and the next interaction. The nodes and the sets of edges may form a graph. Sample data associated with a portion of the graph may be generated. The portion of the graph may include a subset of the nodes and a subset of the sets of edges, the subset of the sets of edges comprising edges connecting the subset of the nodes. A vector for each node of the subset of the nodes may be generated based on the subset of the sets of edges using at least one neural network. A distance between each vector and other vectors of the vectors for subset of nodes may be determined. A relationship between each second entity associated with the subset of nodes to other second entities of the subset of nodes may be determined based on the distance between the vector associated with second entity and the vectors associated with the other second entities.

In some non-limiting embodiments, the portion of the graph may include at least one of a random walk sample of the graph, a weighted random walk sample of the graph any combination thereof, and/or the like.

In some non-limiting embodiments, the neural network(s) may include at least one of a skip-gram model, a continuous bag of words model, a deep neural network, any combination thereof, and/or the like.

In some non-limiting embodiments, a weight of a connection for each node to each other node may be determined based on a number of edges of the sets of edges connecting the node to each other node. Additionally or alternatively, generating the vector for each node may include generating the vector based on the weight of the connections for the node.

In some non-limiting embodiments, the plurality of interactions may include a plurality of payment transactions. Additionally or alternatively, the plurality of first entities may include a plurality of customers, and the plurality of second entities may include a plurality of merchants. In some non-limiting embodiments, a subsequent payment transaction associated with one of the plurality of merchants may be detected based on the relationships of the one of the plurality of merchants. In some non-limiting embodiments, a recommended merchant may be communicated to one of the plurality of customers based on the relationships of the recommended merchant.

According to non-limiting embodiments, provided is a system for determining relationships of entities associated with interactions. In some non-limiting embodiments, the system for determining relationships of entities associated with interactions may include at least one processor and at least one non-transitory computer readable medium comprising instructions to direct the at least one processor to receive interaction data associated with a plurality of interactions between a plurality of first entities and a plurality of second entities. The interaction data associated with each interaction of the plurality of interactions may include first entity identification data identifying a respective first entity of the plurality of first entities, second entity identification data identifying a respective second entity of the plurality of second entities, relative timing data associated with a relative timing of the interaction, any combination thereof, and/or the like. A node may be generated for each second entity of the plurality of second entities. A set of edges for each respective first entity of the plurality of first entities may be generated. The set of edges may include, for each interaction of the plurality of interactions including first entity identification data identifying the respective first entity, an edge connecting the node associated with second entity identification data of the interaction to the node associated with second entity identification data of a next interaction of the plurality of interactions including first entity identification data identifying the respective first entity based on the relative timing data of the interaction and the next interaction. The nodes and the sets of edges may form a graph. Sample data associated with a portion of the graph may be generated. The portion of the graph may include a subset of the nodes and a subset of the sets of edges. The subset of the sets of edges may include edges connecting the subset of the nodes. A vector may be generated for each node of the subset of the nodes based on the subset of the sets of edges using at least one neural network. A distance between each vector and other vectors of the vectors may be determined for the subset of nodes. A relationship between each second entity associated with the subset of nodes to other second entities of the subset of nodes may be determined based on the distance between the vector associated with the second entity and the vectors associated with the other second entities.

In some non-limiting embodiments, the portion of the graph may include at least one of a random walk sample of the graph, a weighted random walk sample of the graph, any combination thereof, and/or the like.

In some non-limiting embodiments, the neural network(s) may include at least one of a skip-gram model, a continuous bag of words model, a deep neural network, any combination thereof, and/or the like.

In some non-limiting embodiments, the instructions may further direct the at least one processor to determine, for each node, a weight of a connection to each other node based on a number of edges of the sets of edges connecting the node to each other node. Additionally or alternatively, generating the vector for each node may include generating the vector based on the weight of the connections for the node.

In some non-limiting embodiments, the plurality of interactions may include a plurality of payment transactions, the plurality of first entities may include a plurality of customers, and the plurality of second entities may include a plurality of merchants. Additionally or alternatively, the instructions may further direct the at least one processor to detect a subsequent payment transaction associated with one of the plurality of merchants based on the relationships of the one of the plurality of merchants. Additionally or alternatively, the instructions may further direct the at least one processor to communicate a recommended merchant to one of the plurality of customers based on the relationships of the recommended merchant.

According to non-limiting embodiments, provided is a computer program product for determining relationships of entities associated with interactions. The computer program product may include at least one non-transitory computer-readable medium including one or more instructions that, when executed by at least one processor, cause the at least one processor to receive interaction data associated with a plurality of interactions between a plurality of first entities and a plurality of second entities. The interaction data associated with each interaction of the plurality of interactions may include first entity identification data identifying a respective first entity of the plurality of first entities, second entity identification data identifying a respective second entity of the plurality of second entities, relative timing data associated with a relative timing of the interaction, any combination thereof, and/or the like. A node may be generated for each second entity of the plurality of second entities. A set of edges for each respective first entity of the plurality of first entities may be generated. The set of edges may include, for each interaction of the plurality of interactions including first entity identification data identifying the respective first entity, an edge connecting the node associated with second entity identification data of the interaction to the node associated with second entity identification data of a next interaction of the plurality of interactions including first entity identification data identifying the respective first entity based on the relative timing data of the interaction and the next interaction. The nodes and the sets of edges may form a graph. Sample data associated with a portion of the graph may be generated. The portion of the graph may include a subset of the nodes and a subset of the sets of edges. The subset of the sets of edges may include edges connecting the subset of the nodes. A vector may be generated for each node of the subset of the nodes based on the subset of the sets of edges using at least one neural network. A distance between each vector and other vectors of the vectors may be determined for the subset of nodes. A relationship between each second entity associated with the subset of nodes to other second entities of the subset of nodes may be determined based on the distance between the vector associated with the second entity and the vectors associated with the other second entities.

In some non-limiting embodiments, the portion of the graph may include at least one of a random walk sample of the graph, a weighted random walk sample of the graph, any combination thereof, and/or the like.

In some non-limiting embodiments, the neural network(s) may include at least one of a skip-gram model, a continuous bag of words model, a deep neural network, any combination thereof, and/or the like.

In some non-limiting embodiments, the instructions may further cause the at least one processor to determine, for each node, a weight of a connection to each other node based on a number of edges of the sets of edges connecting the node to each other node. Additionally or alternatively, generating the vector for each node may include generating the vector based on the weight of the connections for the node.

In some non-limiting embodiments, the plurality of interactions may include a plurality of payment transactions, the plurality of first entities may include a plurality of customers, and the plurality of second entities may include a plurality of merchants. Additionally or alternatively, the instructions may further cause the at least one processor to detect a subsequent payment transaction associated with one of the plurality of merchants based on the relationships of the one of the plurality of merchants. Additionally or alternatively, the instructions may further cause the at least one processor to communicate a recommended merchant to one of the plurality of customers based on the relationships of the recommended merchant.

Further embodiments are set forth in the following numbered clauses:

Clause 1: A method for determining relationships of entities associated with interactions, comprising: receiving, with at least one processor, interaction data associated with a plurality of interactions between a plurality of first entities and a plurality of second entities, the interaction data associated with each interaction of the plurality of interactions comprising first entity identification data identifying a respective first entity of the plurality of first entities, second entity identification data identifying a respective second entity of the plurality of second entities, and relative timing data associated with a relative timing of the interaction; generating, with at least one processor, a node for each second entity of the plurality of second entities; generating, with at least one processor, a set of edges for each respective first entity of the plurality of first entities, the set of edges comprising, for each interaction of the plurality of interactions comprising first entity identification data identifying the respective first entity, an edge connecting the node associated with second entity identification data of the interaction to the node associated with second entity identification data of a next interaction of the plurality of interactions comprising first entity identification data identifying the respective first entity based on the relative timing data of the interaction and the next interaction, the nodes and the sets of edges forming a graph; generating, with at least one processor, sample data associated with a portion of the graph, the portion of the graph comprising a subset of the nodes and a subset of the sets of edges, the subset of the sets of edges comprising edges connecting the subset of the nodes; generating, with at least one processor, a vector for each node of the subset of the nodes based on the subset of the sets of edges using at least one neural network; determining, with at least one processor, a distance between each vector and other vectors of the vectors for the subset of nodes; and determining, with at least one processor, a relationship between each second entity associated with the subset of nodes to other second entities of the subset of nodes based on the distance between the vector associated with the second entity and the vectors associated with the other second entities.

Clause 2: The method of clause 1, wherein the portion of the graph comprises at least one of a random walk sample of the graph or a weighted random walk sample of the graph.

Clause 3: The method of clauses 1 or 2, wherein the at least one neural network comprises at least one of a skip-gram model, a continuous bag of words model, or a deep neural network.

Clause 4: The method of any preceding clause, further comprising, for each node, determining, with at least one processor, a weight of a connection to each other node based on a number of edges of the sets of edges connecting the node to each other node.

Clause 5: The method of any preceding clause, wherein generating the vector for each node comprises generating the vector based on the weight of the connections for the node.

Clause 6: The method of any preceding clause, wherein the plurality of interactions comprise a plurality of payment transactions, the plurality of first entities comprise a plurality of customers, and the plurality of second entities comprise a plurality of merchants.

Clause 7: The method of any preceding clause, further comprising detecting, with at least one processor, a subsequent payment transaction associated with one of the plurality of merchants based on the relationships of the one of the plurality of merchants.

Clause 8: The method of any preceding clause, further comprising communicating, with at least one processor, a recommended merchant to one of the plurality of customers based on the relationships of the recommended merchant.

Clause 9: A system for determining relationships of entities associated with interactions, comprising: at least one processor; and at least one non-transitory computer readable medium comprising instructions to direct the at least one processor to: receive interaction data associated with a plurality of interactions between a plurality of first entities and a plurality of second entities, the interaction data associated with each interaction of the plurality of interactions comprising first entity identification data identifying a respective first entity of the plurality of first entities, second entity identification data identifying a respective second entity of the plurality of second entities, and relative timing data associated with a relative timing of the interaction; generate a node for each second entity of the plurality of second entities; generate a set of edges for each respective first entity of the plurality of first entities, the set of edges comprising, for each interaction of the plurality of interactions comprising first entity identification data identifying the respective first entity, an edge connecting the node associated with second entity identification data of the interaction to the node associated with second entity identification data of a next interaction of the plurality of interactions comprising first entity identification data identifying the respective first entity based on the relative timing data of the interaction and the next interaction, the nodes and the sets of edges forming a graph; generate sample data associated with a portion of the graph, the portion of the graph comprising a subset of the nodes and a subset of the sets of edges, the subset of the sets of edges comprising edges connecting the subset of the nodes; generate a vector for each node of the subset of the nodes based on the subset of the sets of edges using at least one neural network; determine a distance between each vector and other vectors of the vectors for the subset of nodes; and determine a relationship between each second entity associated with the subset of nodes to other second entities of the subset of nodes based on the distance between the vector associated with the second entity and the vectors associated with the other second entities.

Clause 10: The system of clause 9, wherein the portion of the graph comprises at least one of a random walk sample of the graph or a weighted random walk sample of the graph.

Clause 11: The system of any one of clauses 9 or 10, wherein the at least one neural network comprises at least one of a skip-gram model, a continuous bag of words model, or a deep neural network.

Clause 12: The system of any one of clauses 9-11, wherein the instructions further direct the at least one processor to: determine, for each node, a weight of a connection to each other node based on a number of edges of the sets of edges connecting the node to each other node, wherein generating the vector for each node comprises generating the vector based on the weight of the connections for the node.

Clause 13: The system of any one of clauses 9-12, wherein the plurality of interactions comprise a plurality of payment transactions, the plurality of first entities comprise a plurality of customers, and the plurality of second entities comprise a plurality of merchants.

Clause 14: The system of any one of clauses 9-13, wherein the instructions further direct the at least one processor to at least one of: detect a subsequent payment transaction associated with one of the plurality of merchants based on the relationships of the one of the plurality of merchants; or communicate a recommended merchant to one of the plurality of customers based on the relationships of the recommended merchant.

Clause 15: A computer program product for determining relationships of entities associated with interactions, the computer program product comprising at least one non-transitory computer-readable medium including one or more instructions that, when executed by at least one processor, cause the at least one processor to: receive interaction data associated with a plurality of interactions between a plurality of first entities and a plurality of second entities, the interaction data associated with each interaction of the plurality of interactions comprising first entity identification data identifying a respective first entity of the plurality of first entities, second entity identification data identifying a respective second entity of the plurality of second entities, and relative timing data associated with a relative timing of the interaction; generate a node for each second entity of the plurality of second entities; generate a set of edges for each respective first entity of the plurality of first entities, the set of edges comprising, for each interaction of the plurality of interactions comprising first entity identification data identifying the respective first entity, an edge connecting the node associated with second entity identification data of the interaction to the node associated with second entity identification data of a next interaction of the plurality of interactions comprising first entity identification data identifying the respective first entity based on the relative timing data of the interaction and the next interaction, the nodes and the sets of edges forming a graph; generate sample data associated with a portion of the graph, the portion of the graph comprising a subset of the nodes and a subset of the sets of edges, the subset of the sets of edges comprising edges connecting the subset of the nodes; generate a vector for each node of the subset of the nodes based on the subset of the sets of edges using at least one neural network; determine a distance between each vector and other vectors of the vectors for the subset of nodes; and determine a relationship between each second entity associated with the subset of nodes to other second entities of the subset of nodes based on the distance between the vector associated with the second entity and the vectors associated with the other second entities.

Clause 16: The computer program product of clause 15, wherein the portion of the graph comprises at least one of a random walk sample of the graph or a weighted random walk sample of the graph.

Clause 17: The computer program product of any one of clauses 15 or 16, wherein the at least one neural network comprises at least one of a skip-gram model, a continuous bag of words model, or a deep neural network.

Clause 18: The computer program product of any one of clauses 15-17, wherein the instructions further cause the at least one processor to: determine, for each node, a weight of a connection to each other node based on a number of edges of the sets of edges connecting the node to each other node, wherein generating the vector for each node comprises generating the vector based on the weight of the connections for the node.

Clause 19: The computer program product of any one of clauses 15-18, wherein the plurality of interactions comprise a plurality of payment transactions, the plurality of first entities comprise a plurality of customers, and the plurality of second entities comprise a plurality of merchants.

Clause 20: The computer program product of any one of clauses 15-19, wherein the instructions further cause the at least one processor to at least one of: detect a subsequent payment transaction associated with one of the plurality of merchants based on the relationships of the one of the plurality of merchants; or communicate a recommended merchant to one of the plurality of customers based on the relationships of the recommended merchant.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which:

FIGS. 4A-4C are diagrams of a non-limiting embodiment of an implementation of a non-limiting embodiment of the process shown in FIG. 3 according to the principles of the presently disclosed subject matter.

DESCRIPTION

Figure 1:
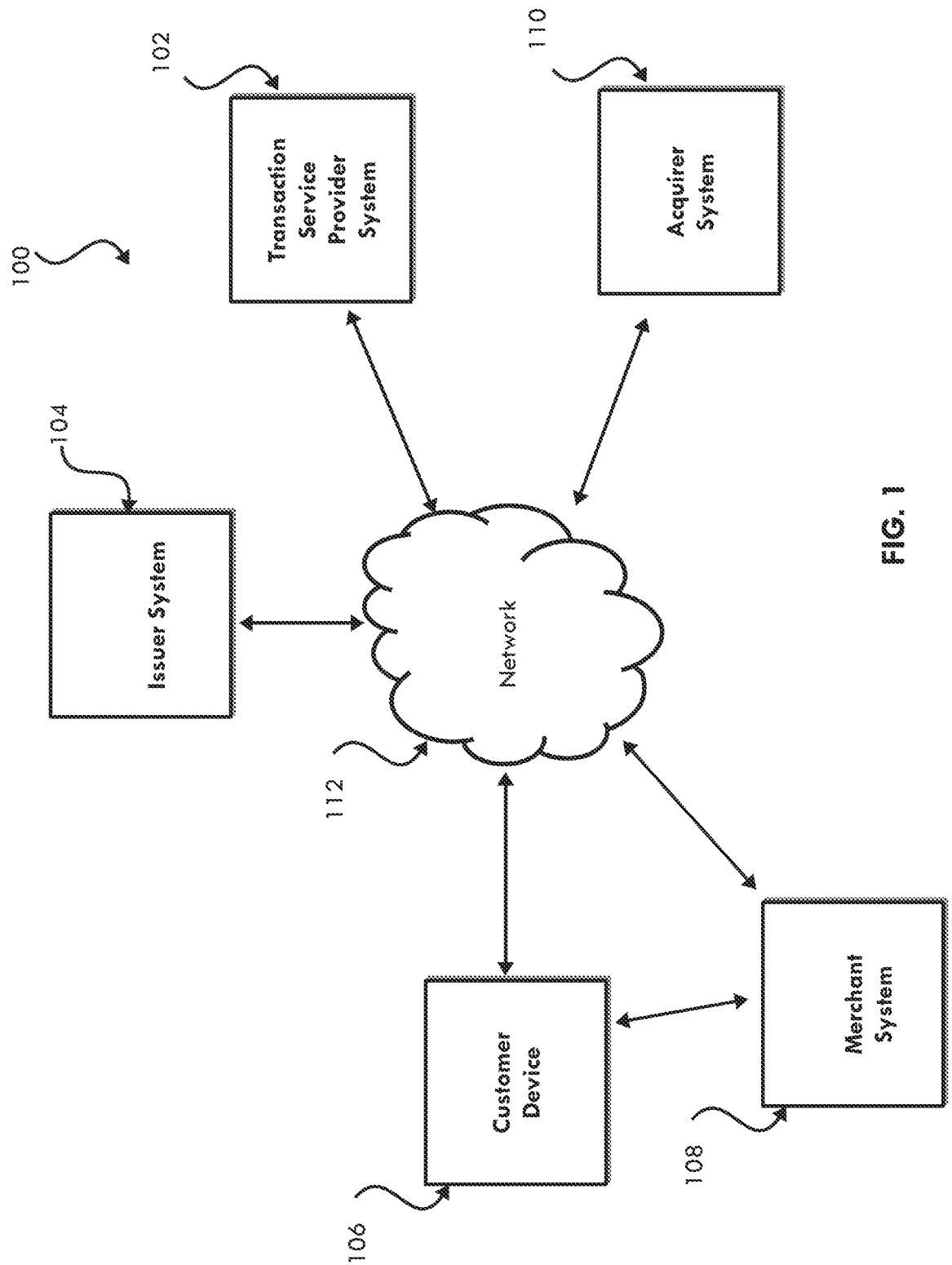
FIG. 1 is a diagram of a non-limiting embodiment of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments, a payment token may be "format preserving" and may have a numeric format that conforms to the account identifiers used in existing payment processing networks (e.g., ISO 8583 financial transaction message format). In some non-limiting embodiments, a payment token may be used in place of a PAN to initiate, authorize, settle, or resolve a payment transaction or represent the original credential in other systems where the original credential would typically be provided. In some non-limiting embodiments, a token value may be generated such that the recovery of the original PAN or other account identifier from the token value may not be computationally derived (e.g., with a one-way hash or other cryptographic function). Further, in some non-limiting embodiments, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments, a requestor may interface with a network token system through any suitable communication network and/or protocol (e.g., using HTTPS, SOAP and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments, token requestor identifiers may be revoked and/or token requestors may be assigned new token requestor identifiers. In some non-limiting embodiments, this information may be subject to reporting and audit by the token service provider.

As used herein, the term a "token service provider" may refer to an entity including one or more server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments, the token service provider may have the ability to set aside licensed BINs as token BINs to issue tokens for the PANs that may be submitted to the token service provider. In some non-limiting embodiments, various entities of a tokenization ecosystem may assume the roles of the token service provider. For example, payment networks and issuers or their agents may become the token service provider by implementing the token services according to non-limiting embodiments of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments, the token vault may be a part of a token service system. For example, the token vault may be provided as a part of the token service provider. Additionally or alternatively, the token vault may be a remote repository accessible by the token service provider. In some non-limiting embodiments, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, "merchant system" may refer to one or more computer systems operated by or on behalf of a merchant, such as a server computer executing one or more software applications. As used herein, the term "product" may refer to one or more goods and/or services offered by a merchant.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments of the disclosed subject matter are directed to systems, methods, and computer program products for determining relationships of entities associated with interactions. For example, non-limiting embodiments of the disclosed subject matter provide determining relationships of entities associated with interactions based on a graph and a neural network to generate vectors for nodes in the graph. Such embodiments provide techniques and systems for determining the relationship between entities based on the distance between the vectors representing such entities. As such, relationships between entities (e.g., as peers, competitors, and/or the like) may be determined automatically with increased accuracy. Additionally or alternatively, non-limiting embodiments of the disclosed subject matter provide determining relationships using sampling (e.g., a random walk sample, a weighted random walk sample, and/or the like) of the graph. Such embodiments provide techniques and systems for efficiently determining the relationships between requiring reduced memory (e.g., about 13,000 times reduction in memory required based on selective sampling to reduce the amount of data used for training a neural network), improving speed (e.g., 1,000 times faster training of the neural network, such as from over a month to tens of minutes (approximately 38 minutes)), and improved accuracy (e.g., accurate results even if data is incomplete, inaccurate, contains misspellings, and/or the like) compared to other models (e.g., models attempting to train a neural network with raw data such as an entire set of interaction data).

For the purpose of illustration, in the following description, while the presently disclosed subject matter is described with respect to methods, systems, and computer program products for determining relationships of entities associated with interactions, e.g., transactions between merchants and/or customers, one skilled in the art will recognize that the disclosed subject matter is not limited to the illustrative embodiments. For example, the methods, systems, and computer program products described herein may be used with a wide variety of settings, such as determining relationships of entities associated in any suitable setting in which the entities interact with each other and/or with a separate set of entities, e.g., fraud detection (e.g., reducing the number of dimensions/amount of data needed to train predictive models for fraud detection), recommendations (e.g., recommending one entity to another entity based on the other entity's interaction with a different entity), and/or the like.

Referring now to FIG. 1, FIG. 1 is a diagram of a non-limiting embodiment of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments, transaction service provider system 102 may be associated with a transaction service provider as described herein. In some non-limiting embodiments, transaction service provider system 102 may be in communication with a data storage device, which may be local or remote to transaction service provider system 102. In some non-limiting embodiments, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via the network, the communication connection, and/or the like. In some non-limiting embodiments, merchant system 108 may include a computing device, such as a server, a group of servers, a client device, a group of client devices, and/or other like devices. In some non-limiting embodiments, merchant system 108 may be associated with a merchant as described herein. In some non-limiting embodiments, merchant system 108 may include one or more client devices. For example, merchant system 108 may include a client device that allows a merchant to communicate information to transaction service provider system 102. In some non-limiting embodiments, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
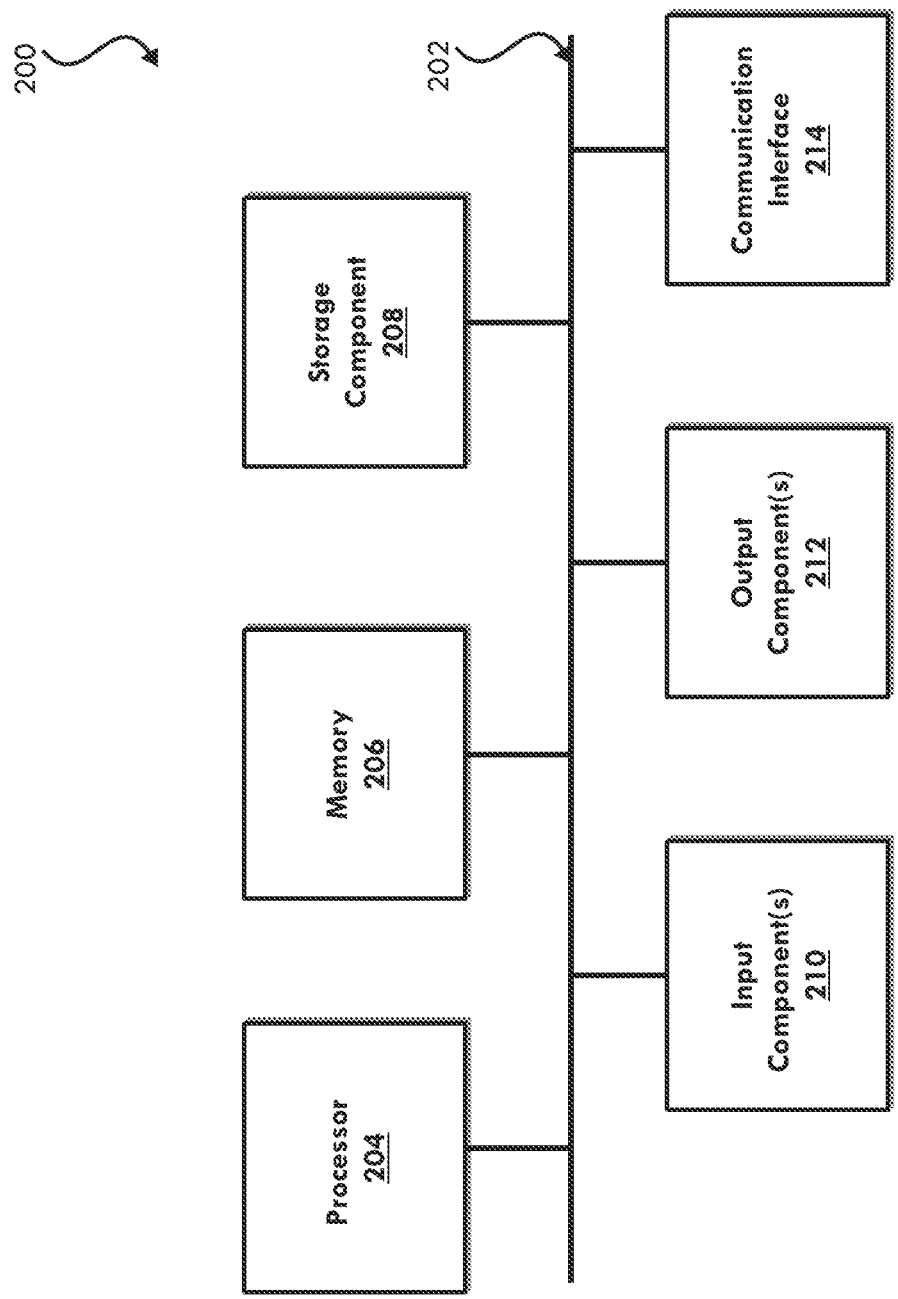
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
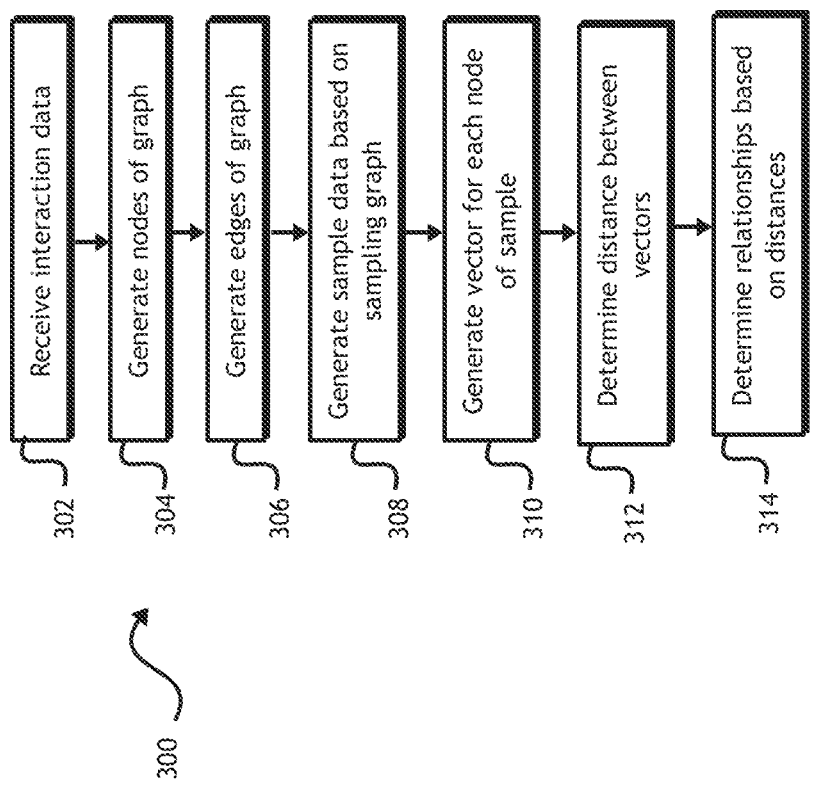
FIG. 3 is a flowchart of a non-limiting embodiment of a process for determining relationships of entities associated with interactions according to the principles of the presently disclosed subject matter.

Referring now to FIG. 3, FIG. 3 is a flowchart of a non-limiting embodiment of a process 300 for determining relationships of entities associated with interactions. In some non-limiting embodiments, one or more of the steps of process 300 may be performed (e.g., completely, partially, and/or the like) by transaction service provider system 102 (e.g., one or more devices of transaction service provider system 102). In some non-limiting embodiments, one or more of the steps of process 300 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

As shown in FIG. 3, at step 302, process 300 may include receiving interaction data. For example, transaction service provider system 102 may receive interaction data (e.g., transaction data, payment transaction data, and/or the like) from at least one of issuer system 104, customer device 106, merchant system 108, acquirer system 110, and/or the like. Additionally or alternatively, transaction service provider system 102 may store and/or retrieve from memory at least some of the interaction data.

In some non-limiting embodiments, the interaction data may be associated with a plurality of interactions between a plurality of first entities and a plurality of second entities. Additionally or alternatively, the interaction data associated with each interaction of the plurality of interactions may include first entity identification data identifying a respective first entity of the plurality of first entities, second entity identification data identifying a respective second entity of the plurality of second entities, relative timing data associated with a relative timing of the interaction, and/or the like.

In some non-limiting embodiments, the plurality of interactions may include a plurality of transactions (e.g., payment transactions and/or the like). In some non-limiting embodiments, the plurality of first entities may include a plurality of customers. Additionally or alternatively, the plurality of second entities may include a plurality of merchants, a plurality of geographic entities (e.g., cities, states, countries, and/or the like), and/or the like.

In some non-limiting embodiments, the interaction data may be associated with a time period. For example, the time period may be a predetermined time period (e.g., a day, a week, a month, and/or the like), a dynamic time period, a selectable time period, and/or the like.

As shown in FIG. 3, at step 304, process 300 may include generating nodes of a graph. For example, transaction service provider system 102 (and/or another device and/or system separate from transaction service provider system 102) may generate nodes based on the interaction data.

In some non-limiting embodiments, a node may be generated (e.g., by transaction service provider system 102) for each second entity of the plurality of second entities. For example, if the second entities include merchants, a node may be generated (e.g., by transaction service provider system 102) for each merchant.

In some non-limiting embodiments, each node may be associated with a name of the entity (e.g., second entity). In some non-limiting embodiments, each node may be based on a concatenation of the name of the entity (e.g., second entity) with other identifying information (e.g., second entity identification data), such as name, city, state/region, country, category (e.g., merchant category code (MCC) and/or the like), address, zip code, phone number, and/or the like.

As shown in FIG. 3, at step 306, process 300 may include generating edges of a graph. For example, transaction service provider system 102 (and/or another device and/or system separate from transaction service provider system 102) may generate a set of edges based on the interaction data.

In some non-limiting embodiments, a set of edges may be generated (e.g., by transaction service provider system 102) for each respective first entity of the plurality of first entities. Additionally or alternatively, for each interaction including first entity identification data identifying the respective first entity, the set of edges may include an edge connecting the node associated with second entity identification data of the interaction to the node associated with second entity identification data of a next interaction of the plurality of interactions that includes first entity identification data identifying the respective first entity based on the relative timing data. In some non-limiting embodiments, the nodes and the sets of edges may form a graph.

In some non-limiting embodiments, if the first entities include customers and the second entities include merchants, interaction data for each respective customer may include transaction data (e.g., payment transaction data and/or the like) associated with transactions between the customer and at least one merchant. The relative timing data associated with the interaction data (e.g., transaction data, payment transaction data and/or the like) may include a time/date stamp, a time index/counter (e.g., a counter that increments by one for each interaction) and/or the like. In some non-limiting embodiments, an edge for a given interaction may connect the node for the merchant associated with that interaction (e.g., based on the second entity identification data) and node for another merchant associated with a next transaction (based on the second entity identification data), and the next transaction may be determined based on the relative time data. For example, if a customer is associated with three interactions (e.g., payment transaction A with merchant X, payment transaction B with merchant Y, and payment transaction C with merchant Z), the set of edges may include an edge from merchant X to merchant Y and an edge from merchant Y to merchant Z.

In some non-limiting embodiments, the edges may be directional. For example, if a customer is associated with two interactions (e.g., payment transaction A with merchant X, and payment transaction B with merchant Y), the set of edges may include a directional edge from merchant X to merchant Y (but not merchant Y to merchant X).

In some non-limiting embodiments, a weight of a connection for each node to each other node may be determined (e.g., by transaction service provider system 102) based on a number of edges of the sets of edges connecting the node to each other node. For example, if multiple edges of a set of edges associated with one first entity connect a node of second entity A to second entity B, the weight of the connection between second entity A to second entity B may increase. Additionally or alternatively, if sets of edges for multiple first entities include at least one edge connecting a node of second entity A to second entity B, the weight of the connection between second entity A to second entity B may increase.

In some non-limiting embodiments, the weight may be determined by at least one metric, separate from or including the number of edges connecting nodes. For example, weight may further be based on a value associated with each interaction (e.g., a payment amount of each payment transaction), a number of first entities (e.g., customers) associated with edges connecting the nodes, and/or the like.

As shown in FIG. 3, at step 308, process 300 may include generating sample data based on the graph. For example, transaction service provider system 102 (and/or another device and/or system separate from transaction service provider system 102) may generate sample data based on sampling the graph.

In some non-limiting embodiments, sample data associated with a portion of the graph may be generated (e.g., by transaction service provider 102). For example, the portion of the graph may include a subset of the nodes and a subset of the sets of edges. Additionally or alternatively, the subset of the sets of edges may include edges connecting the subset of the nodes.

In some non-limiting embodiments, the portion of the graph may include at least one of a random walk sample of the graph, a weighted random walk sample of the graph, and/or the like. In some non-limiting embodiments, the weighted random walk sample may be based on the weights of the connections between the nodes associated with the second entities.

In some non-limiting embodiments, a weighted random walk may include starting at a selected node (e.g., node A), randomly choosing a next node (e.g. node B) to proceed to as part of a sequence based on the weights of all connections associated with node A (e.g., higher weight corresponding to a higher probability that the connection will be the one chosen as the next node), and repeating the random choosing to proceed to a selected number of nodes (e.g., node C, node D, etc.) in sequence. Such a sequence may be the resulting sequence of the weighted random walk. In some non-limiting embodiments, the selected number of nodes may be a predetermined number (e.g., one million nodes), a dynamic number, a selectable number, and/or the like.

As shown in FIG. 3, at step 310, process 300 may include generating a vector for each node of the sample. For example, transaction service provider system 102 (and/or another device and/or system separate from transaction service provider system 102) may generate the vector based on the nodes of the sample, the edges, the weights of the connections between the nodes of the sample, and/or the like.

In some non-limiting embodiments, a vector for each node of the subset of the nodes may be generated (e.g., by transaction service provider system 102) based on the subset of the sets of edges using at least one neural network. For example, the neural network(s) may include at least one of a skip-gram model, a continuous bag of words model, or a deep neural network. Additionally or alternatively, generating the vector for each node may include generating the vector based on the weight of the connections for the node (e.g. to the other nodes of the sample/subset).

In some non-limiting embodiments, when the neural network includes a skip gram model, the sequence(s) of the random walk sample(s) may be used as input into the skip gram model. Additionally or alternatively, the skip gram model may be trained to attempt to predict a node that is removed from the sequence based on a selected number of surrounding nodes/neighbors. In some non-limiting embodiments, the selected number of surrounding nodes/neighbors may be a predetermined number (e.g., the two preceding and two subsequent nodes in the sequence), a dynamic number, a selectable number, and/or the like.

As shown in FIG. 3, at step 312, process 300 may include determining a distance between the vectors. For example, transaction service provider system 102 (and/or another device and/or system separate from transaction service provider system 102) may determine the distance between the vector (e.g., the endpoint thereof and/or the like) associated with each node of the subset/sample and the vector associated with each other node of the subset/sample.

In some non-limiting embodiments, a distance between each vector (e.g., the endpoint thereof and/or the like) and other vectors (e.g., the endpoints thereof and/or the like) of the vectors for subset of nodes may be determined (e.g., by transaction service provider) based on Euclidean distance, cosine distance, geometric distance, and/or the like.

As shown in FIG. 3, at step 314, process 300 may include determining relationships based on the distances. For example, transaction service provider system 102 (and/or another device and/or system separate from transaction service provider system 102) may determine the relationship between a respective entity and other entities based on the distance between the vectors associated with the respective entity and the vectors associated with the other entities.

In some non-limiting embodiments, a relationship between each second entity associated with the subset of nodes to other second entities of the subset of nodes may be determined (e.g., by transaction service provider system 102) based on the distance between the vector associated with second entity and the vectors associated with the other second entities. For example, a lesser distance may be associated with a stronger relationship between a respective entity and a given other entity. Additionally or alternatively, a greater distance may be associated with a weaker relationship between the respective entity and the given other entity.

In some non-limiting embodiments, a subsequent interaction (e.g., payment transaction and/or the like) associated with one of the entities (e.g., second entities, such as merchants) may be detected (e.g., by transaction service provider system 102 based on receiving subsequent interaction data from at least one of issuer system 104, customer device 106, merchant system 108, acquirer system 110, and/or the like) based on the relationships of the one of the plurality of merchants. For example, transaction provider system 102 may detect an interaction associated with merchant B based on receiving interaction data associated with merchant A that has a relatively strong relationship with merchant B (e.g., above a threshold, stronger than a proportion of the other merchants, and/or the like).

In some non-limiting embodiments, a recommended entity (e.g., merchant B) may be communicated (e.g., by transaction service provider system 102) to one of the plurality of entities (e.g., customer device 106 of customer A) based on the relationships of the recommended entity (e.g., merchant B) to another entity (e.g., merchant A) with which the one of the entities (e.g., customer A) has had an interaction (e.g., payment transaction). For example, based on the relationship between (e.g., distance between respective vectors of) entities (e.g., merchants A and B) determined as described herein, a second entity (e.g., merchant B, such as a coffee shop) may be related to (e.g., have a low vector distance from and/or the like) the first entity (e.g., merchant A). Additionally or alternatively, a message identifying the second entity as the recommended entity (e.g., merchant B as a recommended merchant) may be communicated to the customer (e.g., customer A) based on the relationship of the second entity (e.g., recommended merchant B) to the first entity (e.g., merchant A). Additionally or alternatively, such message may include an offer (e.g., a coupon, a discount offer, a rebate offer, a reward offer, and/or the like) associated with the second entity. In some non-limiting embodiments, transaction service provider system 102 may receive (e.g., retrieved and/or the like) such an offer from a database of offers (e.g., in at least one a data storage device, which may be local or remote to transaction service provider system 102).

In some non-limiting embodiments, a fraudulent entity (e.g., merchant Y) may be identified by transaction service provider system 102 based on the relationships of the fraudulent entity (e.g., merchant Y) to another entity (e.g., merchant X). Additionally or alternatively, a fraudulent entity (e.g., merchant Y) may be communicated (e.g., by transaction service provider system 102) to one of the plurality of entities (e.g., customer device 106 of customer A, issuer system 104 of issuer A, merchant system 108 of merchant A, acquirer system 110 of acquirer A, and/or the like) based on the relationships of the fraudulent entity (e.g., merchant Y) to another entity (e.g., merchant X) with which the one of the entities (e.g., e.g., customer device 106 of customer A, issuer system 104 of issuer A, merchant system 108 of merchant A, acquirer system 110 of acquirer A, and/or the like) has been involved with an interaction (e.g., payment transaction).

Figure 4B:
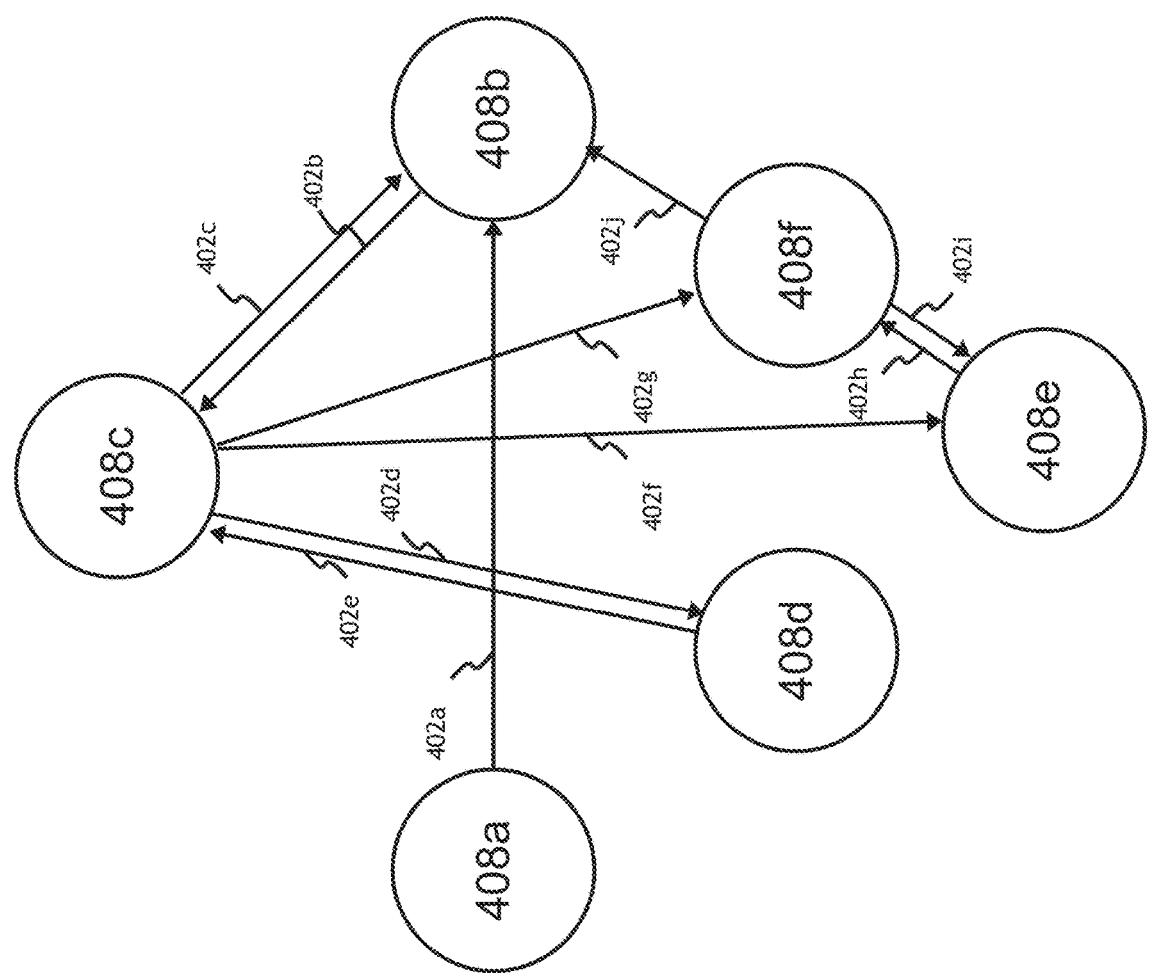

Referring now to FIGS. 4A-4C, FIGS. 4A-4C are diagrams of an exemplary implementation of a non-limiting embodiment relating to process 300 shown in FIG. 3. In some non-limiting embodiments, one or more of the functions described with respect to the implementation shown in FIGS. 4A-4C may be performed (e.g., completely, partially, etc.) by transaction service provider system 102. In some non-limiting embodiments, one or more of the functions described with respect to the implementation shown in FIGS. 4A-4C may be performed (e.g., completely, partially, and/or the like) by another device or a group of devices separate from and/or including transaction service provider system 102, such as issuer system 104, customer device 106, merchant system 108, acquirer system 110, and/or the like.

In some non-limiting embodiments, a system (e.g., transaction service provider system 102 and/or the like) may receive interaction data, as described herein. Additionally or alternatively, the system (e.g., transaction service provider system 102 and/or the like) may store and/or retrieve from memory at least some of the interaction data. In some non-limiting embodiments, the interaction data may be associated with a plurality of interactions between a plurality of first entities (e.g., customers) and a plurality of second entities (e.g., merchants, such as merchant A, merchant B, merchant C, merchant D, merchant E, and merchant F), as described herein.

As shown in FIGS. 4A-4B, the system (e.g., transaction service provider system 102 and/or the like) may generate nodes of a graph, as described herein. For example, the system may generate a node for each second entity (e.g., merchant). As shown in FIGS. 4A-4B, node 408a may be associated with a first merchant (e.g., merchant A), node 408b may be associated with a second merchant (e.g., merchant B), node 408c may be associated with a third merchant (e.g., merchant C), node 408d may be associated with a fourth merchant (e.g., merchant D), node 408e may be associated with a fifth merchant (e.g., merchant E), node 408f may be associated with a sixth merchant (e.g., merchant F), and/or the like.

As shown in FIGS. 4A-4B, the system (e.g., transaction service provider system 102 and/or the like) may generate edges of the graph, as described herein. For example, as shown in FIG. 4A, a first customer (e.g., customer A) may make a first transaction at a first merchant (e.g., merchant A), a second transaction at a second merchant (e.g., merchant B), a third transaction at a third merchant (e.g., merchant C), and a fourth transaction back at the second merchant (e.g., merchant B), and the transactions may be in that order (e.g., relative timing data of the transactions may be in that order). Additionally or alternatively, the system (e.g., transaction service provider system 102 and/or the like) may generate an edge (e.g., a directional edge) connecting the node associated with each transaction to a node associated with the next transaction (e.g., based on relative timing data). For example, the system (e.g., transaction service provider system 102 and/or the like) may generate first edge 402a (e.g., connecting node 408a associated with merchant A based on the first transaction to node 408b associated with merchant B based on the second transaction having relative timing data after the first transaction), second edge 402b (e.g., connecting node 408b associated with merchant B based on the second transaction to node 408c associated with merchant C based on the third transaction having relative timing data after the second transaction), third edge 402c (e.g., connecting node 408c associated with merchant C based on the third transaction to node 408b associated with merchant B based on the fourth transaction having relative timing data after the third transaction), and/or the like. Additionally or alternatively, as shown in FIG. 4B, may generate edges of the graph based on interactions (e.g., transactions) involving other first entities (e.g., customers) and other second entities (e.g. merchants). For example, fourth edge 402d, fifth edge 402e, sixth edge 402f, seventh edge 402g, eighth edge 402h, ninth edge 402i, and tenth edge 402j may be generated, as described herein.

In some non-limiting embodiments, the system (e.g., transaction service provider system 102 and/or the like) may generate sample data based on the graph, as described herein. For example, the sample may include a subset of nodes (e.g., nodes 408a, 408b, 408c, and/or the like). Additionally or alternatively, the system (e.g., transaction service provider system 102 and/or the like) may generate a vector (e.g., for each node of the sample), as described herein. For example, the system (e.g., transaction service provider system 102 and/or the like) may generate first vector 409a for first node 408a, second vector 409b for second node 408b, and third vector 409c for third node 408c, as described herein. In some non-limiting embodiments, the system (e.g., transaction service provider system 102 and/or the like) may determine the distance between the vector (e.g., the endpoint thereof and/or the like) associated with each node of the subset/sample and the vector associated with each other node of the subset/sample, as described herein. Additionally or alternatively, the system (e.g., transaction service provider system 102 and/or the like) may determine the relationship between a respective entity (e.g., a respective merchant) and other entities (e.g., other merchants) based on the distance between the vectors associated therewith, as described herein.

Figure 5A:
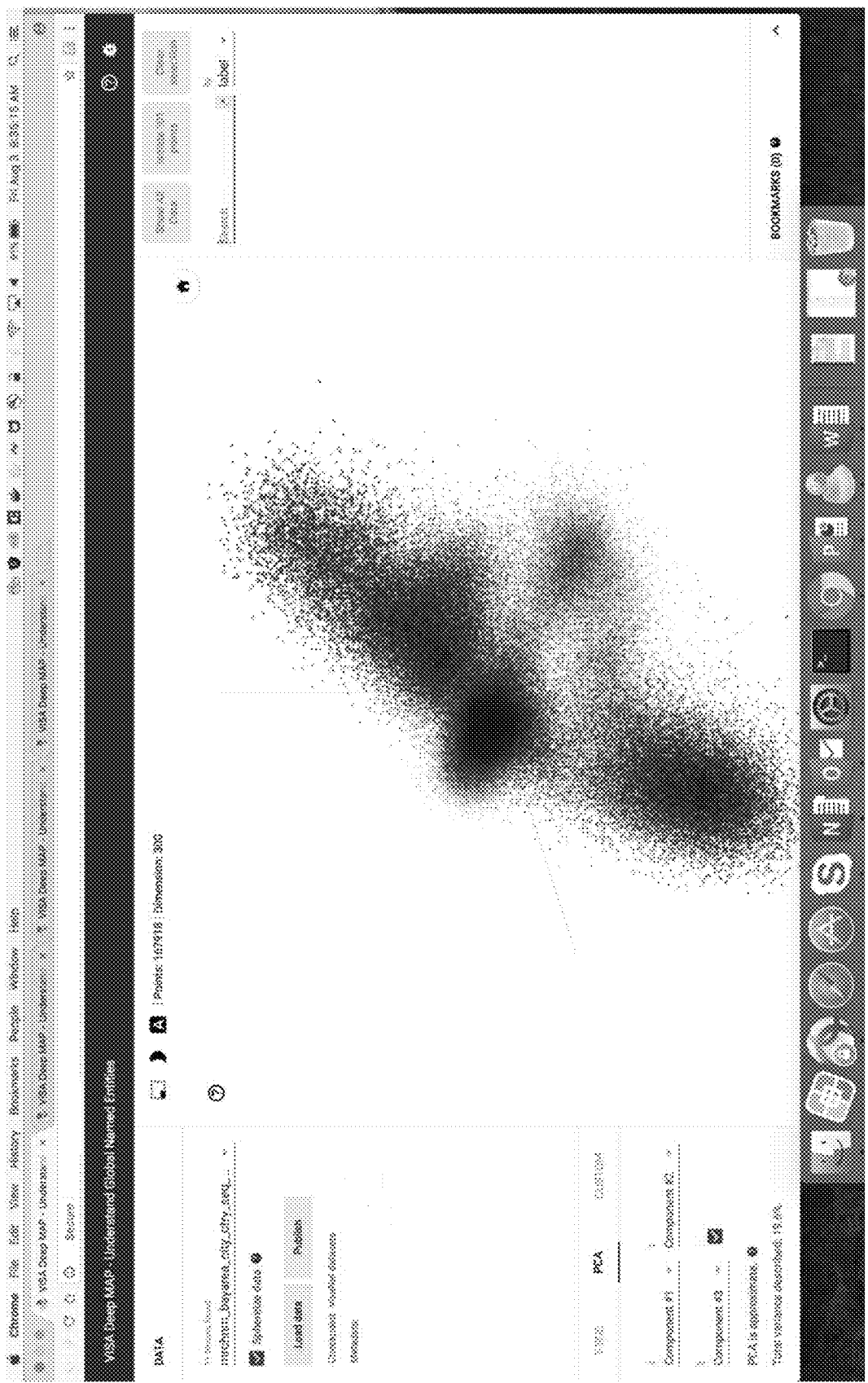
FIGS. 5A-5D are screenshots of a non-limiting embodiment of an implementation of a non-limiting embodiment of the process shown in FIG. 3 according to the principles of the presently disclosed subject matter.

Referring now to FIG. 5A, FIG. 5A is a screenshot of a non-limiting embodiment of an implementation of a non-limiting embodiment of process 300 shown in FIG. 3. As shown in FIG. 5A, all entities (e.g., merchants and/or the like) in an area/region (e.g., the San Francisco Bay Area and/or the like) may be represented as nodes. For the purpose of illustration and not limitation, the nodes are depicted in three-dimensional space. In some non-limiting embodiments, the vector representations of such nodes may have hundreds (e.g., 300 and/or the like) of dimensions. In some non-limiting embodiments, the number of dimensions may be reduced by any suitable technique, e.g., principal component analysis (PCA), T-distributed Stochastic Neighbor Embedding (t-SNE), and/or the like.

Figure 5B:
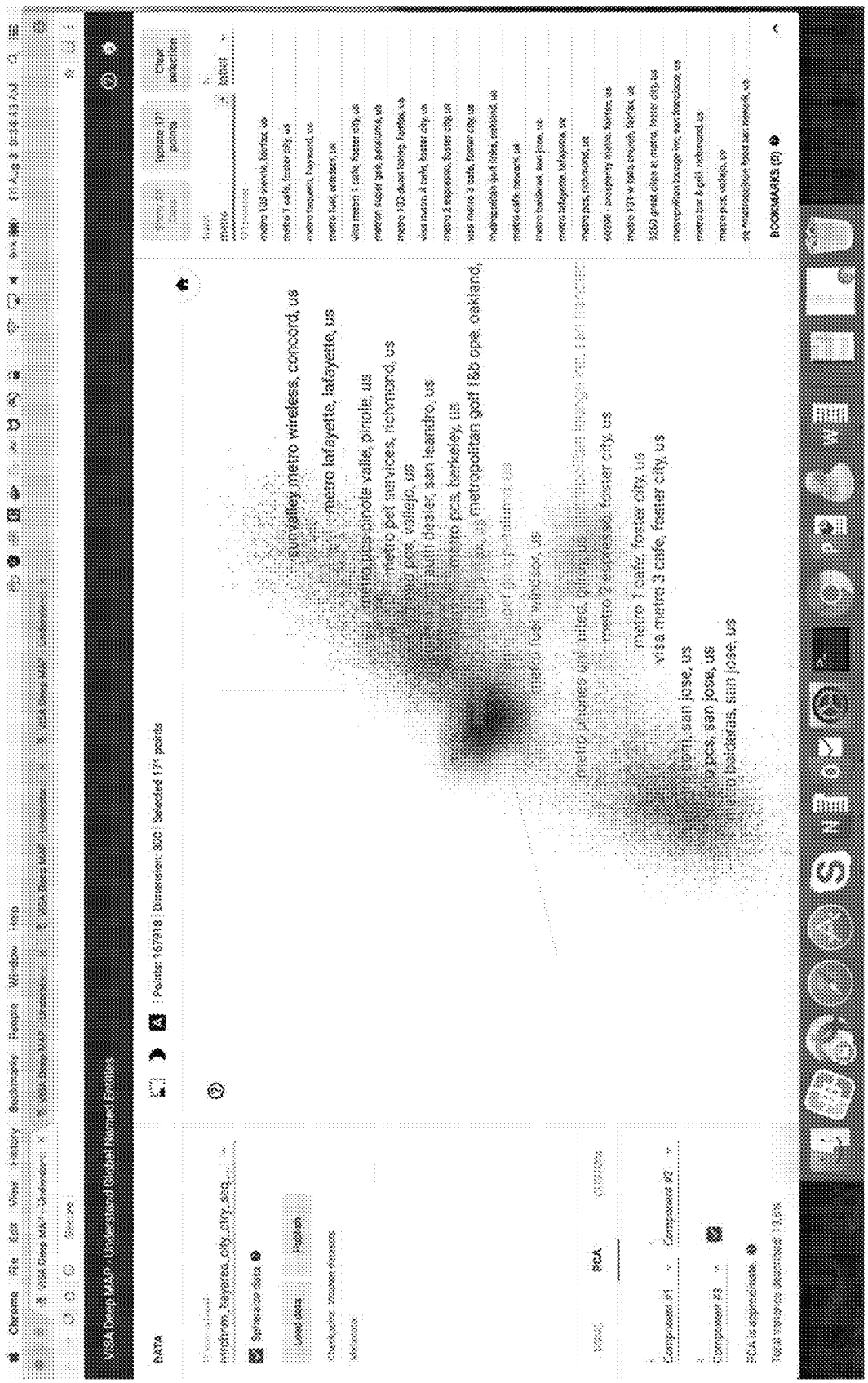

Referring now to FIG. 5B, FIG. 5B is a screenshot of a non-limiting embodiment of an implementation of a non-limiting embodiment of process 300 shown in FIG. 3. As shown in FIG. 5B, all entities (e.g., merchants and/or the like) in an area/region (e.g., the San Francisco Bay Area and/or the like) that meet the selected search criteria (e.g., the word "metro") may be depicted as nodes.

Figure 5C:
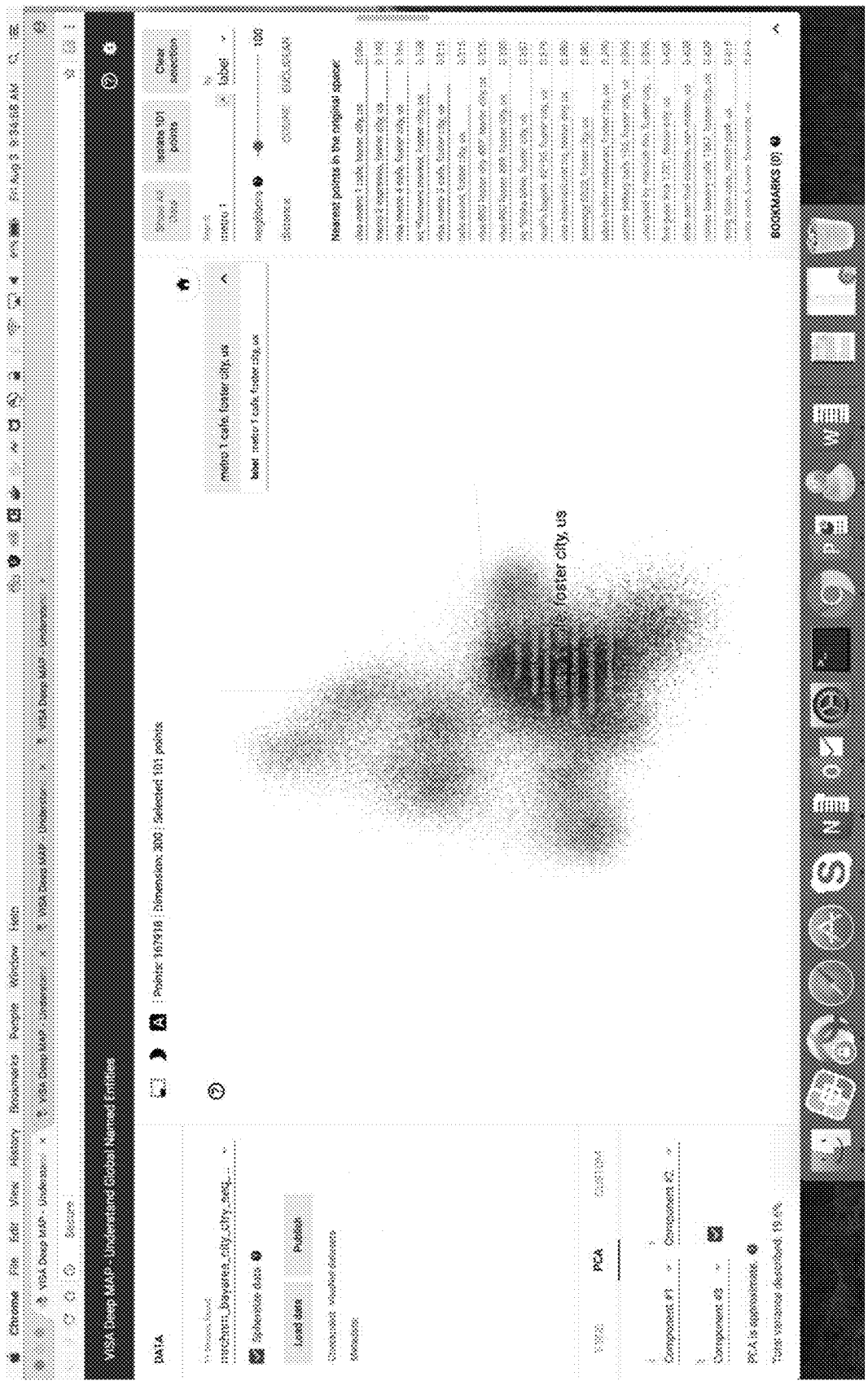

Referring now to FIG. 5C, FIG. 5C is a screenshot of a non-limiting embodiment of an implementation of a non-limiting embodiment of process 300 shown in FIG. 3. As shown in FIG. 5C, the distance between vectors of various nodes to a selected node (e.g., "metro 1 café, foster city, us") may be displayed (e.g., in the column on the right). In some non-limiting embodiments, the number of surrounding nodes/neighbors used for the predictive model(s) (e.g., skip gram model, neural network, and/or the like) may be selectable (e.g., 100). Additionally or alternatively, the method of calculating distance may be selectable (e.g., cosine, Euclidean, and/or the like).

Figure 5D:
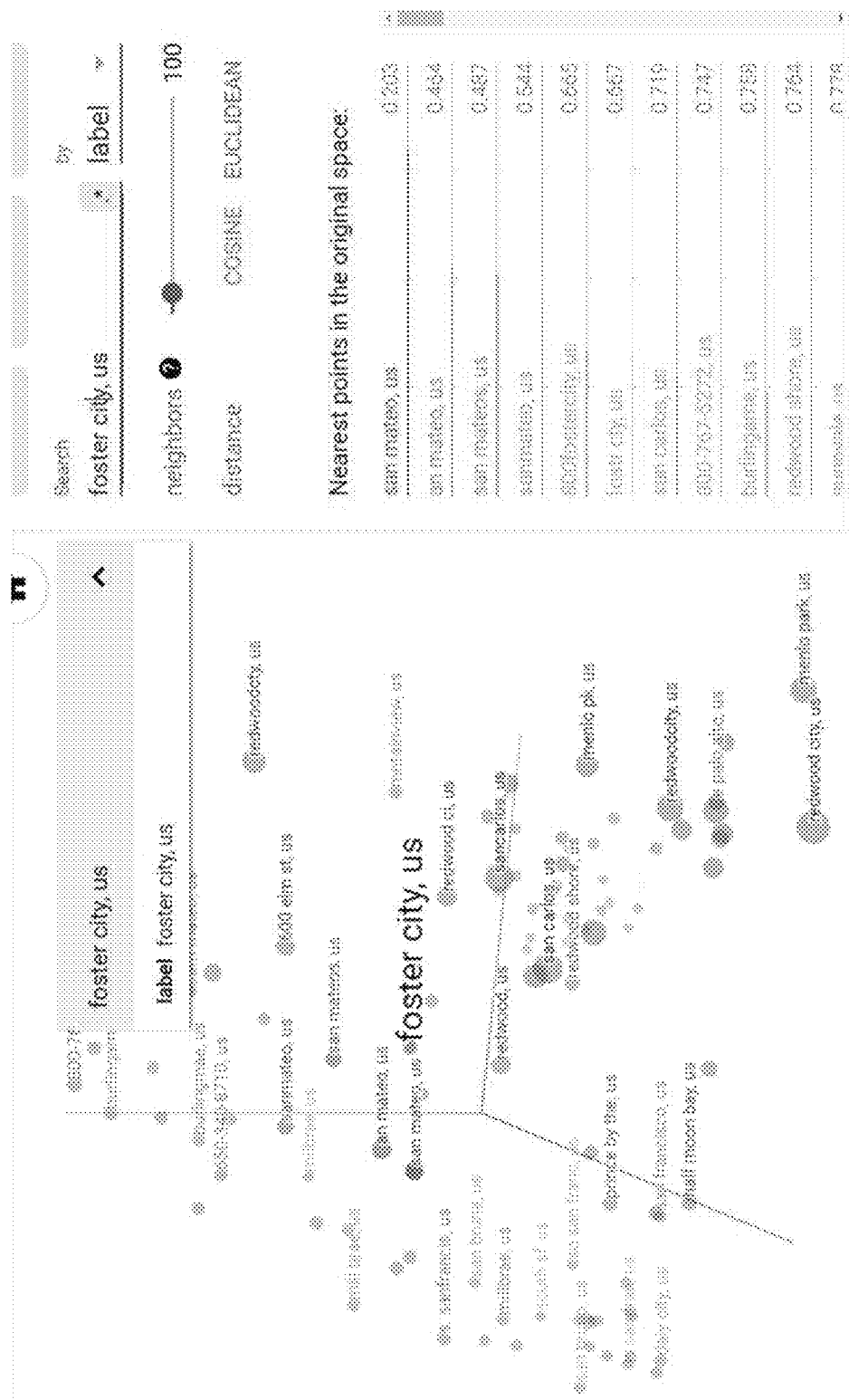

Referring now to FIG. 5D, FIG. 5D is a screenshot of a non-limiting embodiment of an implementation of a non-limiting embodiment of process 300 shown in FIG. 3. As shown in FIG. 5D, the distance between vectors of various nodes to a selected node (e.g., "foster city, us") may be displayed (e.g., in the column on the right). In some non-limiting embodiments, the number of surrounding nodes/neighbors used for the predictive model(s) (e.g., skip gram model, neural network, and/or the like) may be selectable (e.g., 100). Additionally or alternatively, the method of calculating distance may be selectable (e.g., cosine, Euclidean, and/or the like).

Figure 6A:
FIGS. 6A-6D are screenshots of a non-limiting embodiment of an implementation of a non-limiting embodiment of the process shown in FIG. 3 according to the principles of the presently disclosed subject matter.

Referring now to FIGS. 6A-6D, FIGS. 6A-6D are screenshots of a non-limiting embodiment of an implementation of a non-limiting embodiment of process 300 shown in FIG. 3. As shown in FIG. 6A, a user interface may be displayed on a device, such as customer device 106, a device of merchant system 108, a device of transaction service provider system 102, and/or the like. In some non-limiting embodiments, a user (e.g., associated with an entity, such as a merchant and/or the like) may view different customer cohorts (e.g., profiles, such as "PROFILE 1," "PROFILE 2," "PROFILE 3," "PROFILE 4," "PROFILE 5," and/or the like) via the user interface. Additionally or alternatively, the user interface may include information about a selected customer cohort (e.g., "PROFILE 1" and/or the like). For example, such information may include demographic information, propensity to buy information, under-served indication, age, age range, gender, income level, average spending in one or more categories (e.g., monthly), annual spending in one or more categories, average spending on individual products, average spending on individual transactions, spending drop-off distance radius, average distance to a location associated with an entity (e.g., merchant and/or the like), social media accounts, preferred social media platform, in-store spending, online spending, a comparison of in-store spending and online spending in one or more categories, and/or the like. Additionally or alternatively, the user interface may include a score for the customer cohort. For example, such score may be based on the relationship between (e.g., distance between respective vectors of) entities (e.g., merchants) that customers in the customer cohort interact with and the entity (e.g., merchant) associated with the user. Additionally or alternatively, such score may be based on any one of or any combination of the aforementioned items of information displayed in the user interface.

Figure 6B:
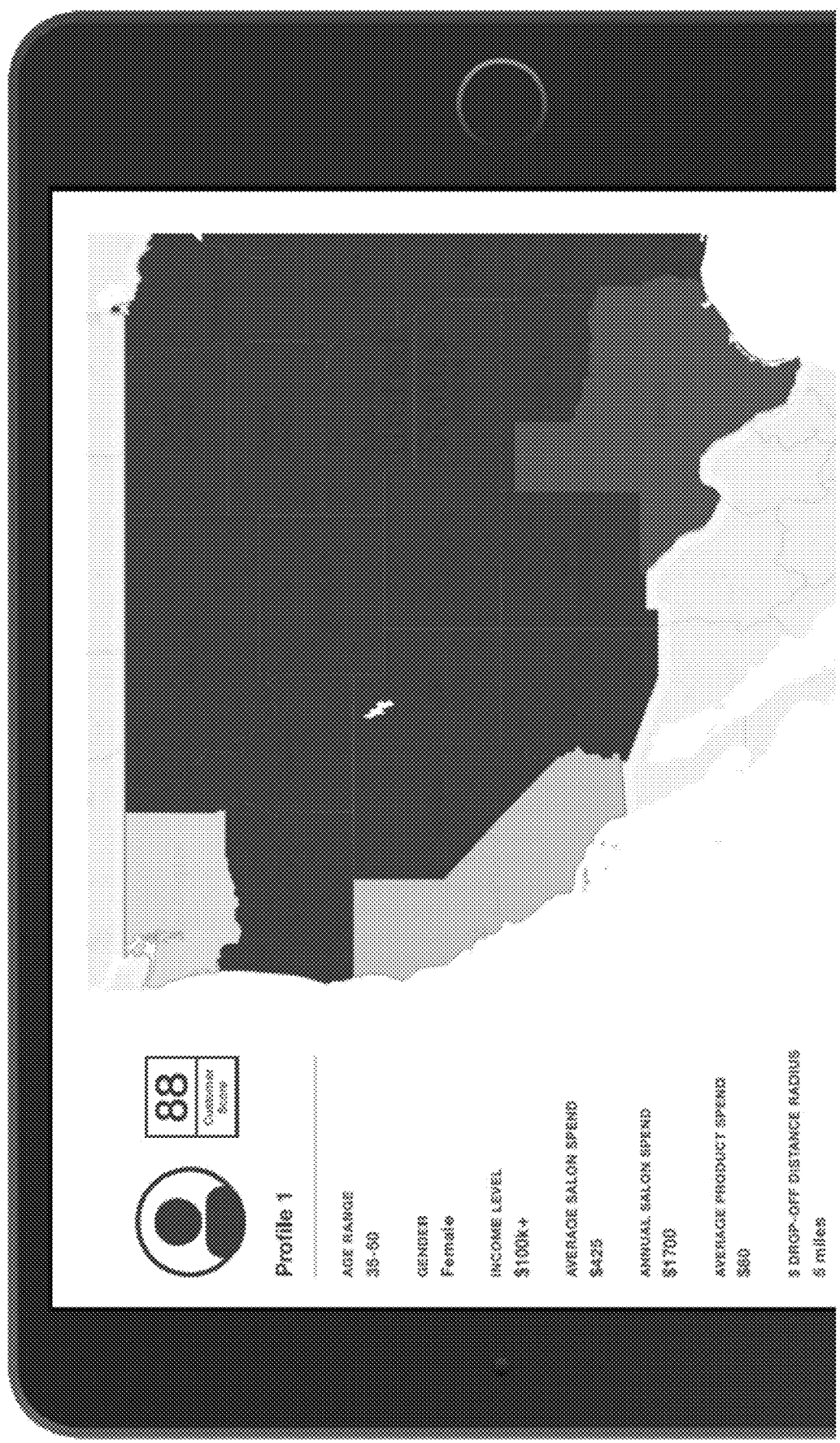
Figure 6C:
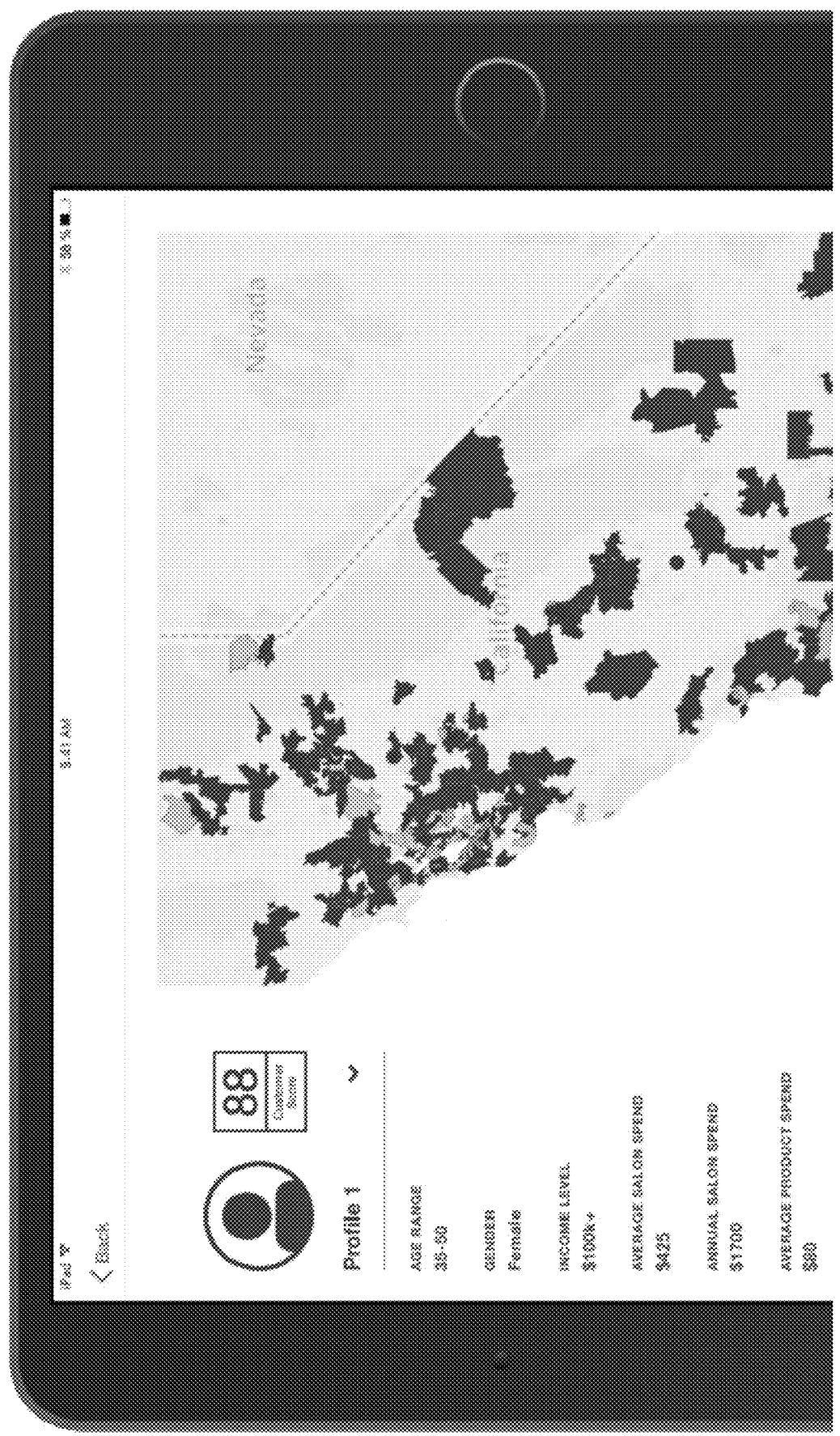
Figure 6D:
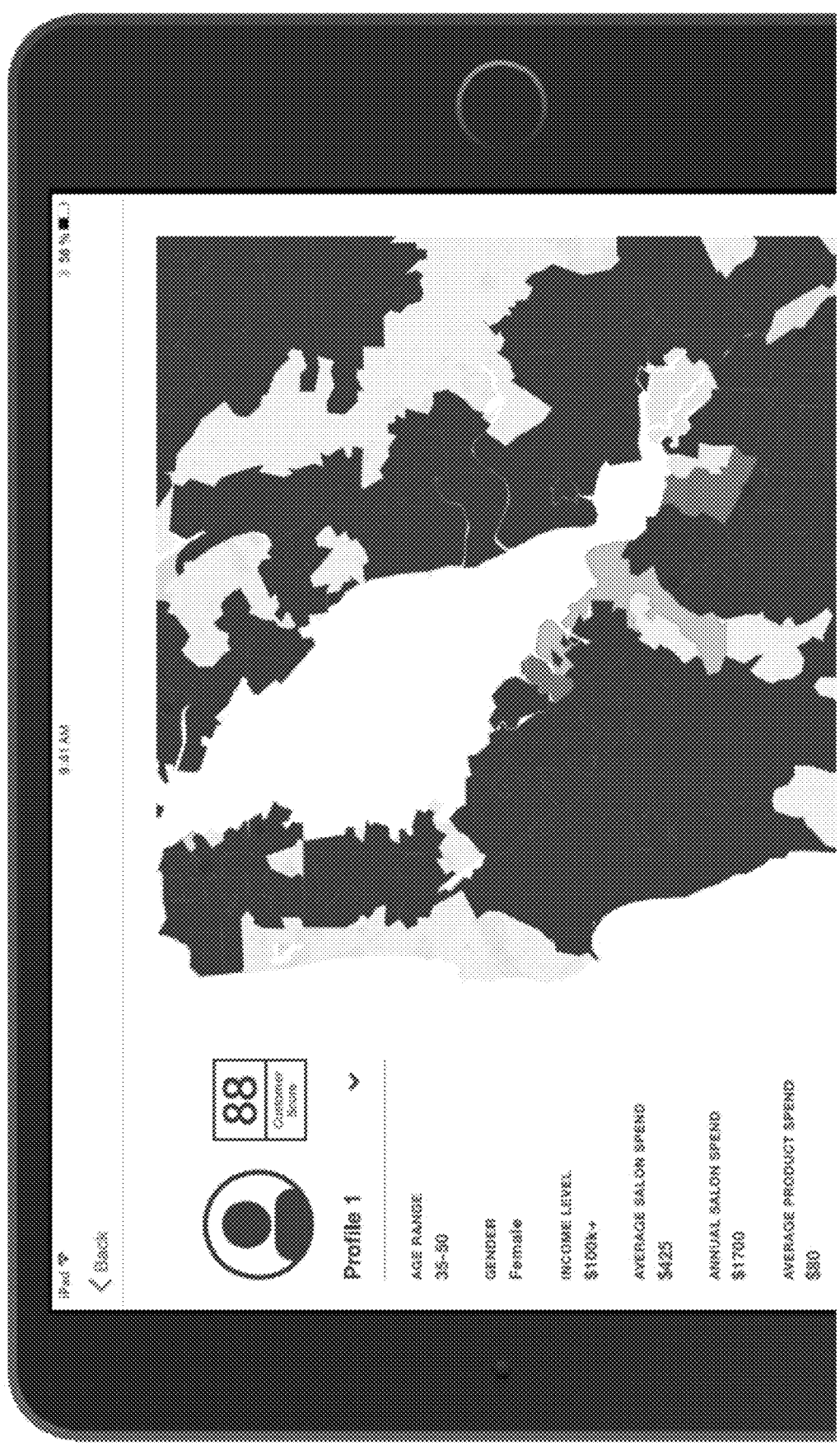

As shown in FIG. 6B-6D, a user interface may be displayed on a device, such as customer device 106, a device of merchant system 108, a device of transaction service provider system 102, and/or the like. In some non-limiting embodiments, a user may view the concentration of customers in a selected customer cohort (e.g., "PROFILE 1" and/or the like) in selected regions. Additionally or alternatively, such concentration may be indicated by color, shading, and/or the like. For example, as shown in FIG. 6B, the concentration of customers is shown for each state visible in the user interface. For example, as shown in FIGS. 6C and 6D, the concentrations in various smaller regions (e.g., counties, municipalities, zip codes, neighborhoods, and/or the like) may be shown (e.g., based on selecting a state or larger region, based on zooming in on an area of the map, and/or the like).

Figure 7B:
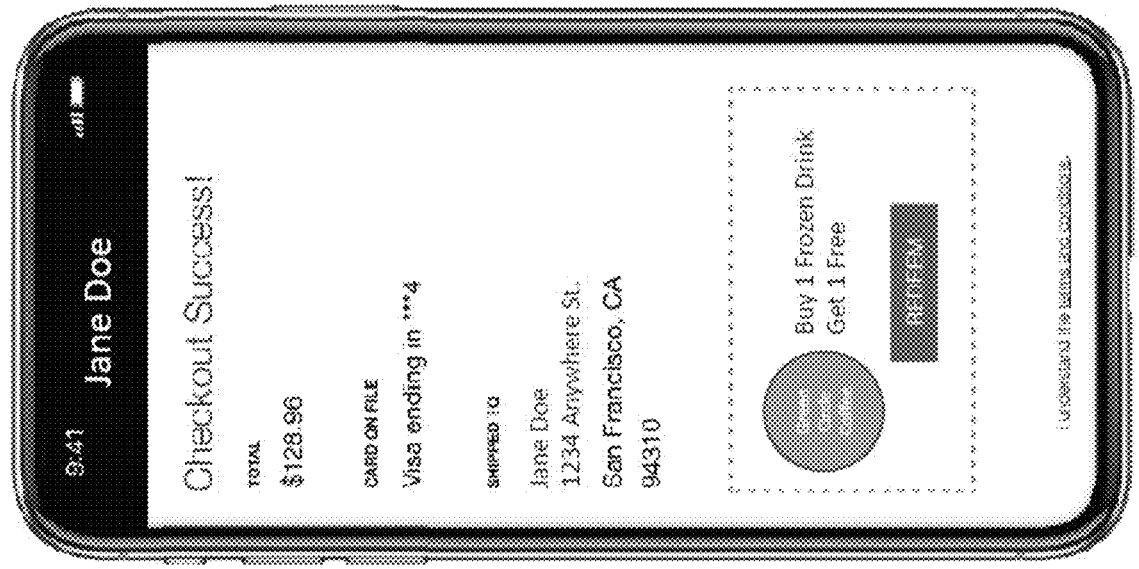
FIGS. 7A-7B are screenshots of a non-limiting embodiment of an implementation of a non-limiting embodiment of the process shown in FIG. 3 according to the principles of the presently disclosed subject matter.
Figure 7A:
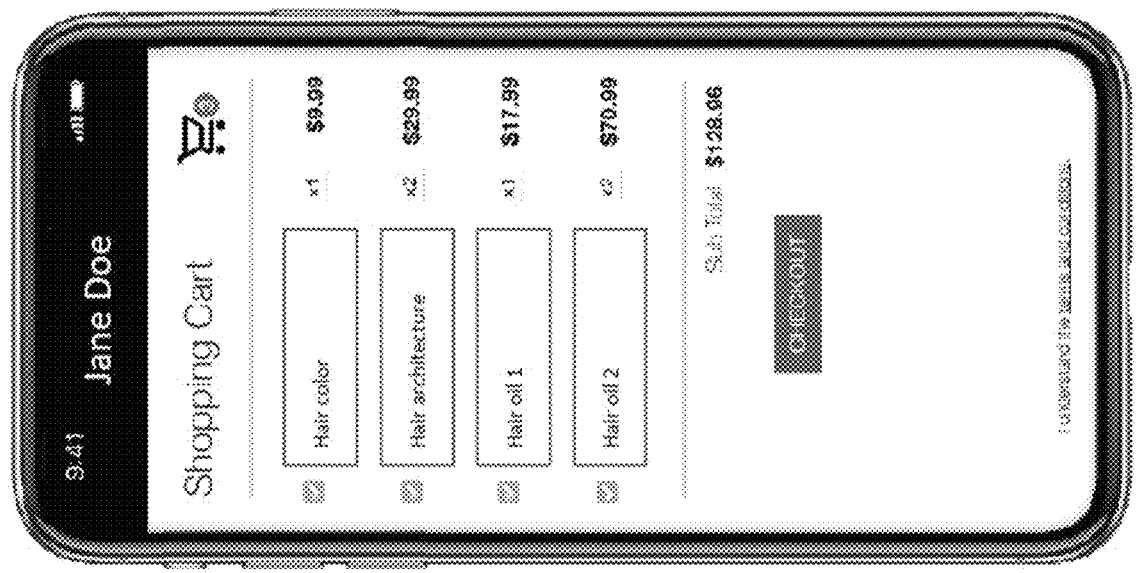

Referring now to FIG. 7A-7B, FIG. 7A-7B are screenshots of a non-limiting embodiment of an implementation of a non-limiting embodiment of process 300 shown in FIG. 3. As shown in FIG. 7A, a customer may purchase at least one (e.g., a plurality or products, such as four different hair products and/or the like) from a first entity (e.g., a first merchant, such as a salon and/or the like).

As shown in FIG. 7B, based on the relationship between (e.g., distance between respective vectors of) entities (e.g., merchants) determined as described herein, a second entity (e.g., a second merchant, such as a coffee shop) may be related to (e.g., have a low vector distance from and/or the like) the first entity. Additionally or alternatively, a message identifying the second entity (e.g., as a recommended merchant) may be communicated to the customer based on the relationship of the second entity (e.g., recommended merchant) to the first entity. Additionally or alternatively, such message may include an offer (e.g., a coupon, a discount offer, a rebate offer, a reward offer, and/or the like) associated with the second entity.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method for determining relationships of entities associated with interactions, comprising:

receiving, with at least one processor, interaction data associated with a plurality of interactions between a plurality of first entities and a plurality of second entities, the interaction data associated with each interaction of the plurality of interactions comprising first entity identification data identifying a respective first entity of the plurality of first entities, second entity identification data identifying a respective second entity of the plurality of second entities, and relative timing data associated with a relative timing of the interaction, wherein the plurality of interactions comprise a plurality of payment transactions, the plurality of first entities comprises a plurality of customers, and the plurality of second entities comprises a plurality of merchants;

generating, with at least one processor, a node for each second entity of the plurality of second entities;

generating, with at least one processor, a set of edges for each respective first entity of the plurality of first entities, the set of edges comprising, for each interaction of the plurality of interactions comprising first entity identification data identifying the respective first entity, an edge connecting the node associated with second entity identification data of the interaction to the node associated with second entity identification data of a next interaction of the plurality of interactions comprising first entity identification data identifying the respective first entity based on the relative timing data of the interaction and the next interaction, the nodes and the sets of edges forming a graph;

generating, with at least one processor, sample data associated with a portion of the graph, the portion of the graph comprising a subset of the nodes and a subset of the sets of edges, the subset of the sets of edges comprising edges connecting the subset of the nodes;

generating, with at least one processor, a vector for each node of the subset of the nodes based on the subset of the sets of edges using at least one neural network;

determining, with at least one processor, a distance between each vector and other vectors of the vectors for the subset of nodes;

determining, with at least one processor, a relationship between each second entity associated with the subset of nodes to other second entities of the subset of nodes based on the distance between the vector associated with the second entity and the vectors associated with the other second entities; and communicating, with at least one processor, a recommended merchant to one of the plurality of customers based on the relationships of the recommended merchant.

2. The method of claim 1, wherein the portion of the graph comprises at least one of a random walk sample of the graph or a weighted random walk sample of the graph.

3. The method of claim 1, wherein the at least one neural network comprises at least one of a skip-gram model, a continuous bag of words model, or a deep neural network.

4. The method of claim 1, further comprising, for each node, determining, with at least one processor, a weight of a connection to each other node based on a number of edges of the sets of edges connecting the node to each other node.

5. The method of claim 4, wherein generating the vector for each node comprises generating the vector based on the weight of the connections for the node.

6. The method of claim 1, further comprising detecting, with at least one processor, a subsequent payment transaction associated with one of the plurality of merchants based on the relationships of the recommended merchant.

7. A system for determining relationships of entities associated with interactions, comprising:

at least one processor; and at least one non-transitory computer readable medium comprising instructions to direct the at least one processor to:

receive interaction data associated with a plurality of interactions between a plurality of first entities and a plurality of second entities, the interaction data associated with each interaction of the plurality of interactions comprising first entity identification data identifying a respective first entity of the plurality of first entities, second entity identification data identifying a respective second entity of the plurality of second entities, and relative timing data associated with a relative timing of the interaction; wherein the plurality of interactions comprise a plurality of payment transactions, the plurality of first entities comprises a plurality of customers, and the plurality of second entities comprises a plurality of merchants;

generate a node for each second entity of the plurality of second entities;

generate a set of edges for each respective first entity of the plurality of first entities, the set of edges comprising, for each interaction of the plurality of interactions comprising first entity identification data identifying the respective first entity, an edge connecting the node associated with second entity identification data of the interaction to the node associated with second entity identification data of a next interaction of the plurality of interactions comprising first entity identification data identifying the respective first entity based on the relative timing data of the interaction and the next interaction, the nodes and the sets of edges forming a graph;

generate sample data associated with a portion of the graph, the portion of the graph comprising a subset of the nodes and a subset of the sets of edges, the subset of the sets of edges comprising edges connecting the subset of the nodes;

generate a vector for each node of the subset of the nodes based on the subset of the sets of edges using at least one neural network;

determine a distance between each vector and other vectors of the vectors for the subset of nodes;

determine a relationship between each second entity associated with the subset of nodes to other second entities of the subset of nodes based on the distance between the vector associated with the second entity and the vectors associated with the other second entities; and communicate a recommended merchant to one of the plurality of customers based on the relationships of the recommended merchant.

8. The system of claim 7, wherein the portion of the graph comprises at least one of a random walk sample of the graph or a weighted random walk sample of the graph.

9. The system of claim 7, wherein the at least one neural network comprises at least one of a skip-gram model, a continuous bag of words model, or a deep neural network.

10. The system of claim 7, wherein the instructions further direct the at least one processor to:

determine, for each node, a weight of a connection to each other node based on a number of edges of the sets of edges connecting the node to each other node, wherein generating the vector for each node comprises generating the vector based on the weight of the connections for the node.

11. The system of claim 7, wherein the instructions further direct the at least one processor to:
   detect a subsequent payment transaction associated with one of the plurality of merchants based on the relationships of the one of the plurality of merchants.

12. A computer program product for determining relationships of entities associated with interactions, the computer program product comprising at least one non-transitory computer-readable medium including one or more instructions that, when executed by at least one processor, cause the at least one processor to:
   receive interaction data associated with a plurality of interactions between a plurality of first entities and a plurality of second entities, the interaction data associated with each interaction of the plurality of interactions comprising first entity identification data identifying a respective first entity of the plurality of first entities, second entity identification data identifying a respective second entity of the plurality of second entities, and relative timing data associated with a relative timing of the interaction, wherein the plurality of interactions comprise a plurality of payment transactions, the plurality of first entities comprises a plurality of customers, and the plurality of second entities comprises a plurality of merchants;
   generate a node for each second entity of the plurality of second entities;
   generate a set of edges for each respective first entity of the plurality of first entities, the set of edges comprising, for each interaction of the plurality of interactions comprising first entity identification data identifying the respective first entity, an edge connecting the node associated with second entity identification data of the interaction to the node associated with second entity identification data of a next interaction of the plurality of interactions comprising first entity identification data identifying the respective first entity based on the relative timing data of the interaction and the next interaction, the nodes and the sets of edges forming a graph;
   generate sample data associated with a portion of the graph, the portion of the graph comprising a subset of the nodes and a subset of the sets of edges, the subset of the sets of edges comprising edges connecting the subset of the nodes;
   generate a vector for each node of the subset of the nodes based on the subset of the sets of edges using at least one neural network;
   determine a distance between each vector and other vectors of the vectors for the subset of nodes;
   determine a relationship between each second entity associated with the subset of nodes to other second entities of the subset of nodes based on the distance between the vector associated with the second entity and the vectors associated with the other second entities; and
   communicate a recommended merchant to one of the plurality of customers based on the relationships of the recommended merchant.

13. The computer program product of claim 12, wherein the portion of the graph comprises at least one of a random walk sample of the graph or a weighted random walk sample of the graph.

14. The computer program product of claim 12, wherein the at least one neural network comprises at least one of a skip-gram model, a continuous bag of words model, or a deep neural network.

15. The computer program product of claim 12, wherein the instructions further cause the at least one processor to:
   determine, for each node, a weight of a connection to each other node based on a number of edges of the sets of edges connecting the node to each other node,
   wherein generating the vector for each node comprises generating the vector based on the weight of the connections for the node.

16. The computer program product of claim 12, wherein the instructions further cause the at least one processor to:
   detect a subsequent payment transaction associated with one of the plurality of merchants based on the relationships of the one of the plurality of merchants.

* * * * *